US011808571B2

(12) United States Patent
Shimizu et al.

(10) Patent No.: US 11,808,571 B2
(45) Date of Patent: Nov. 7, 2023

(54) SURVEYING SYSTEM, STAKING ASSISTANCE METHOD, AND STORAGE MEDIUM STORING STAKING ASSISTANCE PROGRAM

(71) Applicant: Topcon Corporation, Tokyo (JP)

(72) Inventors: Ryosuke Shimizu, Tokyo (JP); Umihiro Ichiriyama, Tokyo (JP); Motohiro Miyajima, Tokyo (JP); Keisuke Nakamura, Tokyo (JP)

(73) Assignee: Topcon Corporation, Tokyo (JP)

( * ) Notice: Subject to any disclaimer, the term of this patent is extended or adjusted under 35 U.S.C. 154(b) by 162 days.

(21) Appl. No.: 17/443,250

(22) Filed: Jul. 22, 2021

(65) Prior Publication Data

US 2022/0034656 A1 Feb. 3, 2022

(30) Foreign Application Priority Data

Jul. 28, 2020 (JP) ................................. 2020-127162

(51) Int. Cl.
*G01C 15/00* (2006.01)
*G01C 15/06* (2006.01)

(52) U.S. Cl.
CPC .......... *G01C 15/002* (2013.01); *G01C 15/06* (2013.01)

(58) Field of Classification Search
CPC .... G01C 15/002; G01C 15/06; G01C 15/004; G01C 9/00; E02D 17/18; E02D 17/207; E02D 33/00
See application file for complete search history.

(56) References Cited

U.S. PATENT DOCUMENTS 6,928,384 B2 * 8/2005 Kochi .................. H04N 13/194
702/155
7,966,740 B2 * 6/2011 Knudsen ............. E04H 12/2284
33/613

(Continued)

FOREIGN PATENT DOCUMENTS

JP       2004-238804 A    8/2004

OTHER PUBLICATIONS

JP-2021031850-A: Ryosuke et al. "Finishing Stake Method and Finishing State System", Mar. 2021. (Year: 2021).*

(Continued)

*Primary Examiner* — John Fitzgerald
*Assistant Examiner* — Tania Courson
(74) *Attorney, Agent, or Firm* — CHIESA, SHAHINIAN & GIANTOMASI PC

(57) ABSTRACT

A surveying system including a surveying device and a terminal device for assisting in placement of a staking tool. The surveying system further includes: a design information acquisition unit for acquiring design information including a designed slope; a surveying information acquisition unit for transmitting surveying information to a terminal device; a current state estimation unit for calculating an estimated altitude of a current ground in accordance with the surveying information; an intersection calculation unit for calculating a coordinate of an intersection between the current ground and the designed slope based on the estimated altitude of the current ground and the design information; a stake shape determination unit for determining a shape of a stake to be placed; and a stake shape information unit for causing the terminal device to inform of the shape of the stake determined by the stake shape determination unit.

6 Claims, 5 Drawing Sheets

(56) References Cited

U.S. PATENT DOCUMENTS

| | | | |
|---|---|---|---|
| 10,469,754 B2 * | 11/2019 | Nagashima | H04N 23/633 |
| 2022/0065629 A1 * | 3/2022 | Shimizu | G01C 15/008 |
| 2022/0074764 A1 * | 3/2022 | Muller | G06T 7/70 |
| 2022/0333926 A1 * | 10/2022 | Shimizu | G01C 15/00 |

OTHER PUBLICATIONS

JP-2005030789-A: Fumio et al. "Finishing Stake Setting Apparatus, and Finishing Stake Setting Method Using the Same" Feb. 2005. (Year: 2005).*

JP-H07127061-A: Tatsunori et al. "Pile Driving Device", May 1995. (Year: 1995).*

JP-H07128060-A: Tatsunori et al. "Installation of Finishing Stake and GPS Antenna Therefor" May 1995. (Year: 1995).*

JP-2008020427-A: Fukada "Finishing Stake Location Setting Method for Civil Engineering Construction Plan and its Device" Jan. 2008. (Year: 2008).*

JP H09280863 A: Saturo et al., "Earthwork Batter Board Setting Method" Apr. 1996. (Year: 1996).*

* cited by examiner

SURVEYING SYSTEM, STAKING ASSISTANCE METHOD, AND STORAGE MEDIUM STORING STAKING ASSISTANCE PROGRAM

BACKGROUND

The present disclosure relates to a surveying system, a staking assistance method, and a staking assistance program.

In civil engineering works, a slope staking tool is placed at a cutting start position (i.e., the top of a slope obtained by cutting) or a banking start position (i.e., the toe of a slope obtained by banking) to indicate the inclination of a slope (hereinafter referred to as a "designed slope") finished by cutting or banking.

As described in Japanese Unexamined Patent Publication No. 2004-238804, for example, a slope staking tool includes two pickets put up in the ground, a crossbeam extending horizontally across the pickets, and a slope beam extending on the crossbeam along a designed slope.

SUMMARY

Depending on the location of the slope staking tool or the positional relationship between the slope staking tool and the slope, the position or orientation of the slope beam to be placed differs. Due to labor shortage and aging labor force in the recent construction industry, there is a shortage of skilled operators capable of easily telling the differences. To address the problem, there is a demand for a surveying system that allows even unexperienced or young operators to easily perform the operation at a site.

It is thus an objective of the present disclosure to provide a surveying system, a staking assistance method, and a staking assistance program that make it possible to easily determine the position or orientation of a slope beam of a slope stake to be placed, even at a site at which a slope staking tool may be located in various positions in various positional relationships with a slope.

In order to achieve the objective described above, a surveying system according to the present disclosure is for assisting placement of a staking tool including a picket, a crossbeam, and a slope beam. The surveying system includes, in addition to a surveying device and a terminal device: a design information acquisition unit configured to acquire design information including a designed slope; a surveying information acquisition unit configured to transmit, to the terminal device, surveying information on surveying by the surveying device; a current state estimation unit configured to calculate an estimated altitude of a current ground in accordance with the surveying information received by the terminal device; an intersection calculation unit configured to calculate a coordinate of an intersection between the current ground and the designed slope based on the estimated altitude of the current ground and the design information including the design slope; a stake shape determination unit configured to determine a shape of a stake to be placed, based on the surveying information and the coordinate of the intersection; and a stake shape information unit configured to cause the terminal device to inform of the shape of the stake determined by the stake shape determination unit.

In order to achieve the objective described above, a staking method according to the present disclosure is a staking assistance method of assisting placement of a staking tool including a picket, a crossbeam, and a slope beam using a surveying system including a surveying device and a terminal device. The method includes: design information acquisition of acquiring design information including a designed slope, using a design information acquisition unit; surveying using the surveying device; surveying information acquisition of transmitting, to the terminal device, surveying information on the surveying, using a surveying information acquisition unit; current state estimation of calculating an estimated altitude of a current ground in accordance with the surveying information received in the surveying information acquisition, using a current state estimation unit; intersection calculation of calculating a coordinate of an intersection between the current ground and the designed slope based on the estimated altitude of the current ground and the design information including the designed slope, using an intersection calculation unit; stake shape determination of determining a shape of a stake to be placed, based on the surveying information and the coordinate of the intersection, using a stake shape determination unit; and stake shape information of causing the terminal device to inform of the shape of the stake determined in the stake shape determination, using a stake shape information unit.

In order to achieve the objective described above, a storage medium storing a staking program of the present disclosure is a storage medium storing a staking assistance program for assisting placement of a staking tool including a picket, a crossbeam, and a slope beam using a surveying system including a surveying device and a terminal device. The program is configured to cause a computer to execute steps including: design information acquisition of acquiring design information including a designed slope, using a design information acquisition unit; surveying using the surveying device; surveying information acquisition of transmitting, to the terminal device, surveying information on the surveying, using a surveying information acquisition unit; current state estimation of calculating an estimated altitude of a current ground in accordance with the surveying information received in the surveying information acquisition, using a current state estimation unit; intersection calculation of calculating a coordinate of an intersection between the current ground and the designed slope based on the estimated altitude of the current ground and the design information including the designed slope, using an intersection calculation unit; stake shape determination of determining a shape of a stake to be placed, based on the surveying information and the coordinate of the intersection, using a stake shape determination unit; and stake shape information of causing the terminal device to inform of the shape of the stake determined in the stake shape determination, using a stake shape information unit.

The present disclosure assists operators to easily determine what kind of a slope staking tool is to be placed, including the position or orientation of a slope beam to be placed, at a site at which the slope staking tool may be located in various positions in various positional relationships with a slope, based on the surveying information and design information that the operators have.

DETAILED DESCRIPTION

<Stake>

Figure 1:
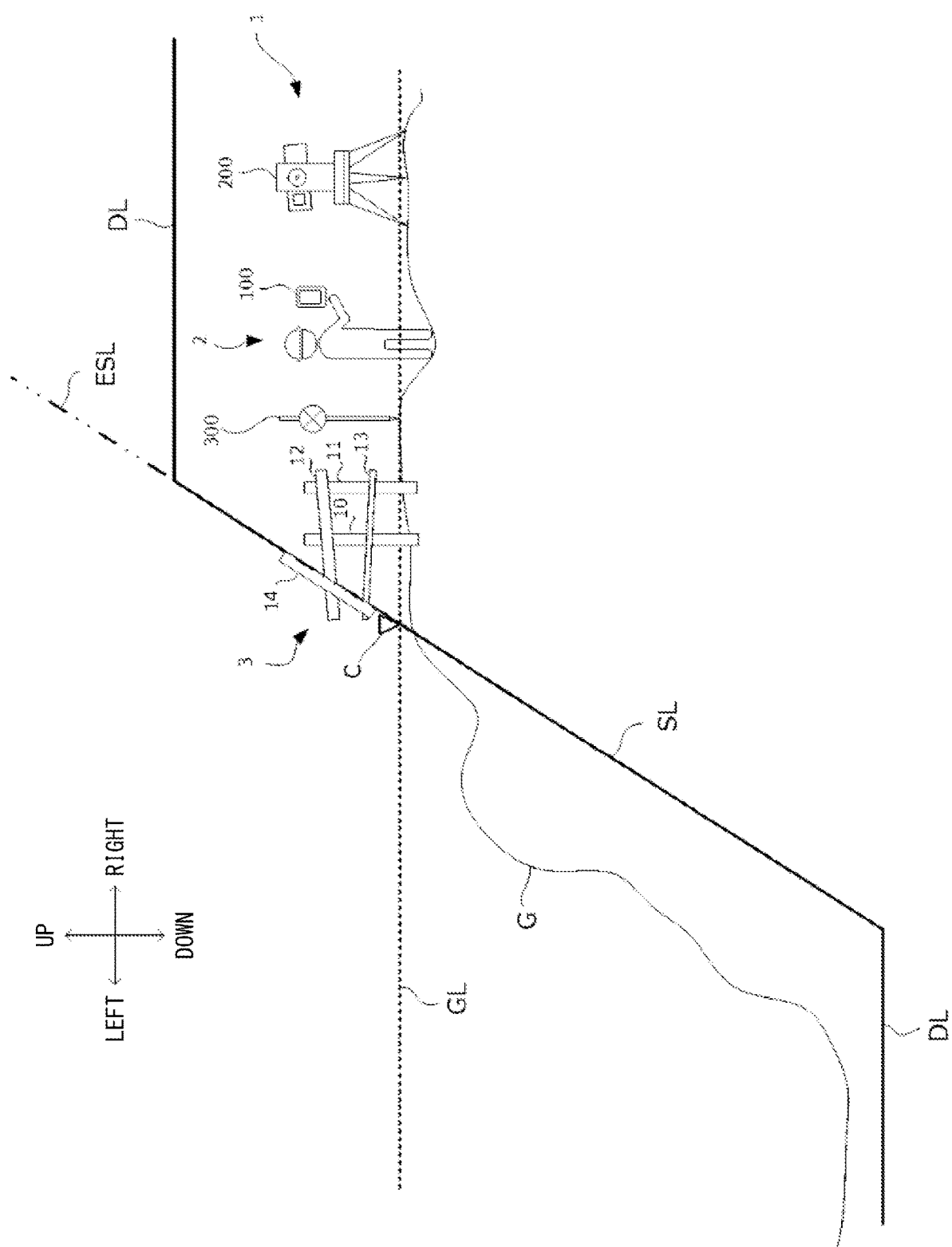
FIG. 1 is for illustrating an outline of a staking operation.
Figure 2:
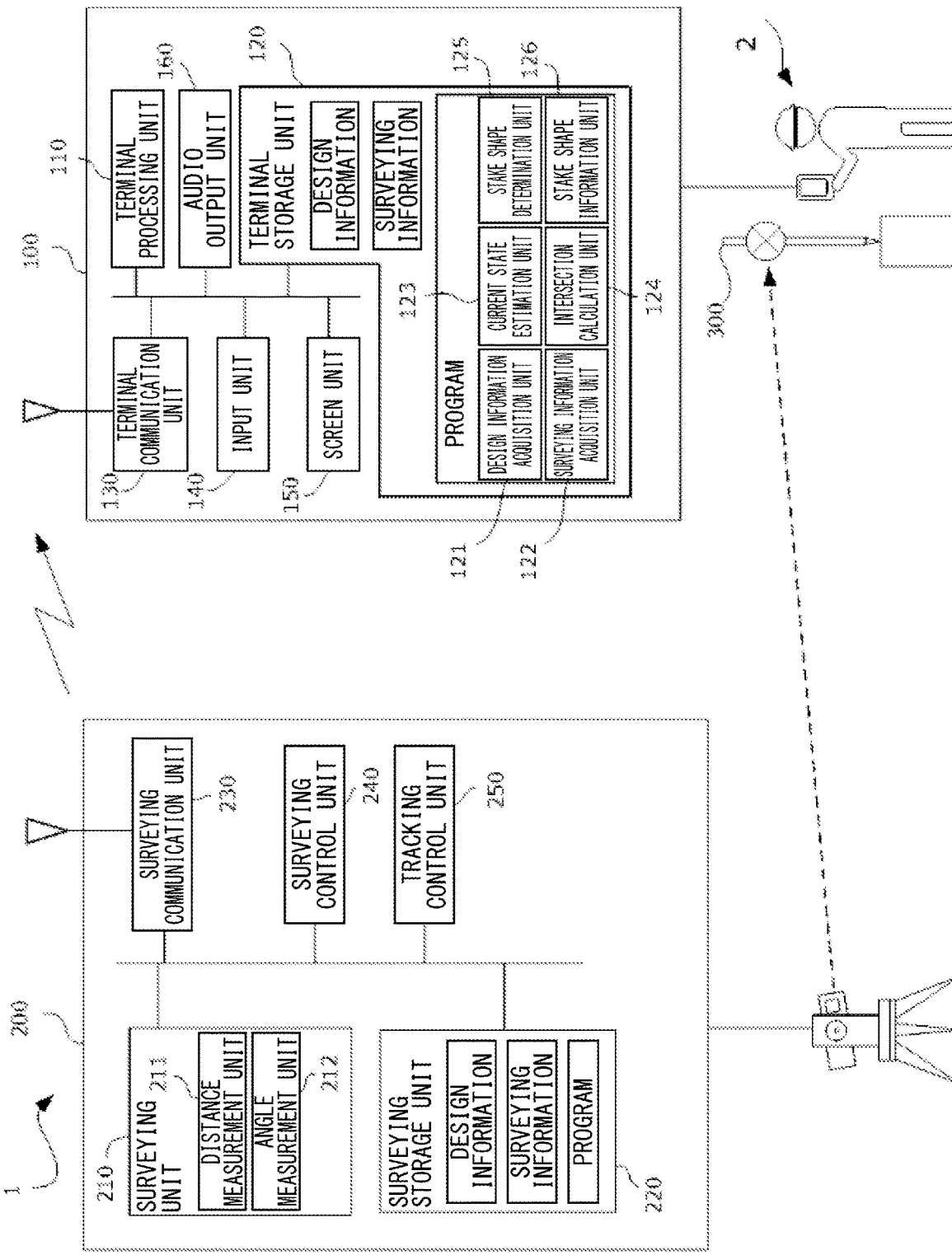
FIG. 2 shows a configuration of a surveying system of an embodiment of the present disclosure.

An embodiment of the present disclosure will be described in detail with reference to the drawings. FIG. 1 illustrates a stake. FIG. 2 shows a configuration of a surveying system of an embodiment of the present disclosure.

First, an outline of a staking operation will be described with reference to FIG. 1. FIG. 1 schematically shows a transverse section including a slope for placing a stake. With the figure oriented to make the letters readable, the up-down direction on the drawing plane corresponds to the height, whereas the left-right direction on the drawing plane corresponds to the horizontal direction in the transverse section including the slope. This figure shows an actual ground G representing an actual ground line, and a design line DL and a designed slope SL in civil engineering and construction work to be performed. In particular, on the design line DL, the designed slope SL is the diagonal line segment showing the designed slope. An extension ESL is the line extending from the designed slope SL beyond the design line DL. A current ground GL is an imaginary ground line indicating the altitude of the actual ground G estimated by surveying. The reference character C denotes the intersection between this current ground GL and the designed slope SL. In the present disclosure, the intersection C between the current ground GL and the designed slope SL includes the intersection C between the current ground GL and the extension ESL. Note that the actual ground G is exaggerated and distorted to be easily distinguished from the design line DL. In civil engineering and construction work, a staking tool 3 is placed for cutting excessive soil and banking up deficient soil along the design line DL and the designed slope SL.

A surveying system 1 includes a terminal device 100 used by an operator 2, a surveying device 200, and a device 300 to be tracked. The operator 2 places the staking tool 3 using the surveying system 1 with these components.

The staking tool 3 is a slope stake or a slope-type stake mainly including a first picket 10, a second picket 11, a first crossbeam 12, a second crossbeam 13, and a slope beam 14. The number of required crossbeams is not necessarily two. Each of the first and second crossbeams 12 and 13 is a plate- or column-like wood intersecting the first and second pickets 10 and 11 and extending across the first and second pickets 10 and 11. For example, the first crossbeam 12 is located above and the second crossbeam 13 is located below. Note that these first picket 10, second picket 11, first crossbeam 12, second crossbeam 13, and slope beam 14 may not have a uniform size.

The slope beam 14 of the staking tool 3 represents the orientation and inclination of a designed slope, and serves as a reference for cutting or banking at a site. The staking tool 3 is thus placed in a proper position to perform survey precisely using the surveying system 1.

The surveying device 200 is, according to an embodiment, a surveying instrument of a light wave type such as a total station (TS) on a known position coordinate, for example. The "light wave type such as TS" includes, in addition to the TS, measurement or other instruments capable of performing measurement equivalent to the TS with an automatic tracking function and using light waves without mounting any telescope. The surveying device 200 can automatically track a predetermined position of the device 300 to be tracked as a target. The device 300 to be tracked includes an optical element that reflects the light radiated from the surveying device 200 back to the surveying device 200. That is, the optical element is what is called a "retroreflective prism". The device 300 to be tracked may be a pole for surveying that has a typical length and includes a retroreflective prism.

Note that the surveying device 200 and the device 300 to be tracked are physically separated but fulfil the surveying function in cooperation with each other. The device 300 to be tracked may also be interpreted as being integrally included in the surveying device 200.

<Configuration of System>

The surveying device 200 and the terminal device 100 will be described with reference to FIG. 2. The surveying device 200 includes a horizontal rotation driving unit and a telescope unit on the horizontal rotation driving unit with a vertical rotation driving unit interposed therebetween. The horizontal rotation driving unit is supported by a tripod and drives horizontal rotation. The vertical rotation drive unit is vertically rotatable. Although not shown, the surveying device 200 includes horizontal and vertical angle detection unit as angle measurement units 212. The horizontal angle detection unit detects the horizontal rotation angle, whereas the vertical angle detection unit detects the vertical rotation angle. These horizontal and vertical angle detection units make it possible to perform measurement of the horizontal and vertical angles of the collimation direction, respectively.

The surveying device 200 further includes, as distance measurement units 211, for example, an electro-optical distance meter that measures the slope distance to the device 300 to be tracked. For the sake of simplicity, these angle and distance measurement units 212 and 211 are collectively referred to as a "surveying unit 210."

The surveying device 200 further includes a surveying storage unit 220, a surveying communication unit 230, a surveying control unit 240, and a tracking control unit 250.

The surveying storage unit 220 stores, in advance, various programs for the surveying, tracking, or other controls; or information (e.g., the altitude) on the ground to be used at a construction site, design information, or other information.

The surveying communication unit 230 is communicative with external devices such as the terminal device 100 and is, for example, a wireless communication means.

The surveying control unit 240 functions to control the surveying by the surveying device 200. Specifically, the surveying control unit 240 automatically or manually collimates the device 300 to be tracked. The surveying control unit 240 detects the horizontal angle, the vertical angle, and the slope distance between the surveying device 200 and the device 300 to be tracked using the angle measurement units (i.e., the horizontal and vertical angle detection units) 212 and the distance measurement units 211 described above. Here, the retroreflective prism as an example of the device 300 to be tracked is attached to a pole. The distance from the prism to a tip of the pole is known. The surveying control unit 240 thus corrects the horizontal angle, vertical angle, and slope distance detected by the angle and distance measurement units 212 and 211, and obtains the position of the tip (i.e., the position of the upper or lower end) of the pole, as surveying results.

The tracking control unit 250 controls the drive of the horizontal and vertical rotation drive units to project tracking light and to continuously receive the tracking light reflected by the device 300 to be tracked, thereby tracking the device 300 to be tracked.

Another embodiment of the surveying device 200 is a GNSS surveying instrument. In this case, surveying is performed using a GNSS receiver as the device 300 to be tracked.

Examples of the terminal device 100 include a smartphone, a feature phone, a tablet, a handheld computer device (e.g., a personal digital assistant (PDA)), and a wearable terminal (e.g., a glasses-type device or a watch-type device). A general-purpose terminal is, with application software installed, usable as a portable display terminal of this embodiment. Such the terminal device 100 includes a screen unit 150 and is easily carriable at a work site. The screen unit 150 may be viewed hands-free or with one hand. The terminal device 100 may also include an internal power supply such as a battery and may thus be operatable for a certain period without requiring external power supply.

The terminal device 100 includes a terminal communication unit 130, a terminal storage unit 120, a terminal processing unit 110, an input unit 140, the screen unit 150, and an audio output unit 160.

Although not shown, the terminal processing unit 110 executes the functions and/or methods implemented by codes or commands included in the programs stored in the terminal storage unit 120. Examples of the terminal processing unit 110 include a central processing unit (CPU), a microprocessor unit (MPU), a graphics processing unit (GPU), a microprocessor, a processor core, a multiprocessor, an application specific integrated circuit (ASIC), and a field-programmable gate array (FPGA). The terminal processing unit 110 may include a logic circuit or a dedicated circuit formed in an integrated circuit, for example, to execute the processing disclosed in the embodiment. These circuits may be one or more integrated circuits. A single integrated circuit may execute the plurality of processing described in the embodiment. Although not shown, the terminal device 100 may include a main storage unit that temporarily stores the programs to be read out from the terminal storage unit 120 and provides a workspace to the terminal processing unit 110.

The terminal communication unit 130 is communicative with the surveying communication unit 230 of the surveying device 200, and can receive the surveying results, position information, or other information. The surveying results are results of surveying the device 300 to be tracked using the surveying device 200. The position information (e.g., the horizontal angle, the vertical angle, and the slope distance to the pole tip) calculated using the surveying control unit 240. The position information may be calculated, based on the surveying results, by the surveying device 200 or the terminal device 100. The communications may be wired or wireless. As long as mutual communications are established, any communication protocol may be used.

The input unit 140 is any one or a combination of all types of devices capable of receiving inputs from a user, that is, the operator 2 and providing the information related to the inputs to the terminal processing unit 110. Examples include, in addition to a hardware input means such as buttons, a software input means displayed on a display unit such as a touch panel, and an audio input means such as a remote controller or a microphone.

The screen unit 150 is any one or a combination of all types of devices capable of displaying a screen. Examples include a flat display such as a liquid crystal display or an organic light emitting diode (OLED) display, a curved display, a folding screen on a foldable terminal, a head-mounted display, or a device displayable through projection on a substance using a small projector.

The audio output unit 160 is a what is called a "speaker" that functions to convert the audio data stored in the terminal storage unit 120 or the audio data received through communication into sound, and emit the sound.

The terminal storage unit 120 functions to store various necessary programs or various data. In addition, the terminal storage unit 120 can store the surveying information received by the terminal communication unit 130 and the position information calculated based on the surveying information. For example, the terminal storage unit 120 stores the design information including the information (e.g., the altitude) on the ground used at a construction site or the design information on a slope. The terminal storage unit 120 is any of various storage media such as a hard disk drive (HDD), a solid state drive (SSD), and a flash memory.

The design information includes blueprints necessary for construction works. Examples of the construction works include constructions of structures such as buildings, roads, railroads, tunnels, bridges, ditches, waterways, and rivers. The blueprints include plan views, longitudinal sectional views, and transverse sectional views; and the linear data, the point data, and the positions, coordinates, and altitudes of the points and line segments included in the views.

The terminal storage unit 120 stores, as application software programs, a design information acquisition unit 121, a surveying information acquisition unit 122, a current state estimation unit 123, an intersection calculation unit 124, a stake shape determination unit 125, and a stake shape information unit 126 that fulfil various functions.

The design information acquisition unit 121 mainly functions to acquire the design information including the designed slope from the design information stored in the terminal storage unit 120 or the surveying storage unit 220. For example, the design information acquisition unit 121 reads the linear data, the point data, the positions, coordinates, and altitudes of the points and line segments stored in the terminal storage unit 120. The design information acquisition unit 121 may acquire, as the design information, the information input by the operator 2 through the input unit 140. Alternatively, the design information acquisition unit 121 may transmit and receive, for acquisition, the design information stored in the surveying storage unit 220 of the surveying device 200 through the communications between the surveying communication unit 230 and the terminal communication unit 130.

The surveying information acquisition unit 122 functions to acquire the surveying information measured by the surveying device 200 and transmitted to the terminal device 100 by the surveying communication unit 230. For example, the surveying information acquisition unit 122 may transmit and receive, for acquisition, the results of surveying performed by the surveying device 200 and the position information through the communications between the surveying communication unit 230 and the terminal communication unit 130. Alternatively, the surveying information acquisition unit 122 may acquire, as the design information, the information input by the operator 2 through the input unit 140.

The current state estimation unit 123 functions to calculate the estimated altitude of the current ground in accordance with the surveying information received by the terminal device 100. Such calculation processing may be performed inside the terminal device 100 without being displayed on the screen unit 150. For example, the position of the tip of the retroreflective prism pole, which is the device 300 to be tracked, placed on the actual ground G, or the position indicating the altitude thereof may be calculated as the current ground GL. The current ground GL may be, as a result of the calculation processing, drawn and displayed on the screen unit 150.

The intersection calculation unit 124 functions to calculate the coordinate of the intersection C between the current ground GL and the designed slope SL using the design information including the estimated altitude of the current ground GL and the designed slope SL. Such calculation processing may be performed inside the terminal device 100 without being displayed on the screen unit 150. For example, the intersection calculation unit 124 calculates the coordinate and position of the intersection C between the designed slope SL or its extension ESL, which acquired by the design information acquisition unit 121, and the estimated current ground GL. The intersection C may be, as a calculation result, drawn and displayed on the screen unit 150.

The stake shape determination unit 125 functions to determine the shape of the stake to be placed, based on the surveying information and the coordinate of the intersection C. Such determination processing may be performed inside the terminal device 100 without being displayed on the screen unit 150. The determination on the shape of the stake will be described later.

The stake shape information unit 126 functions to inform of the shape of the stake determined by the stake shape determination unit 125 via the terminal device 100. The stake shape information unit 126 may cause the screen unit 150 of the terminal device 100 to display the shape of the stake as an image. Alternatively, the stake shape information unit 126 may cause the audio output unit 160 of the terminal device 100 to output the shape of the stake as sound. The stake shape information unit 126 may further inform of the procedure of placing the stake, namely, the order of arranging the pickets, crossbeams, and slope beam constituting the staking tool corresponding to the stake shape as images or sound.

<Staking Guide Function>

Now, an outline of a staking guide function as an aspect of the surveying system, the staking assistance method, and staking assistance program of an embodiment of the present disclosure will be described.

Figure 3:
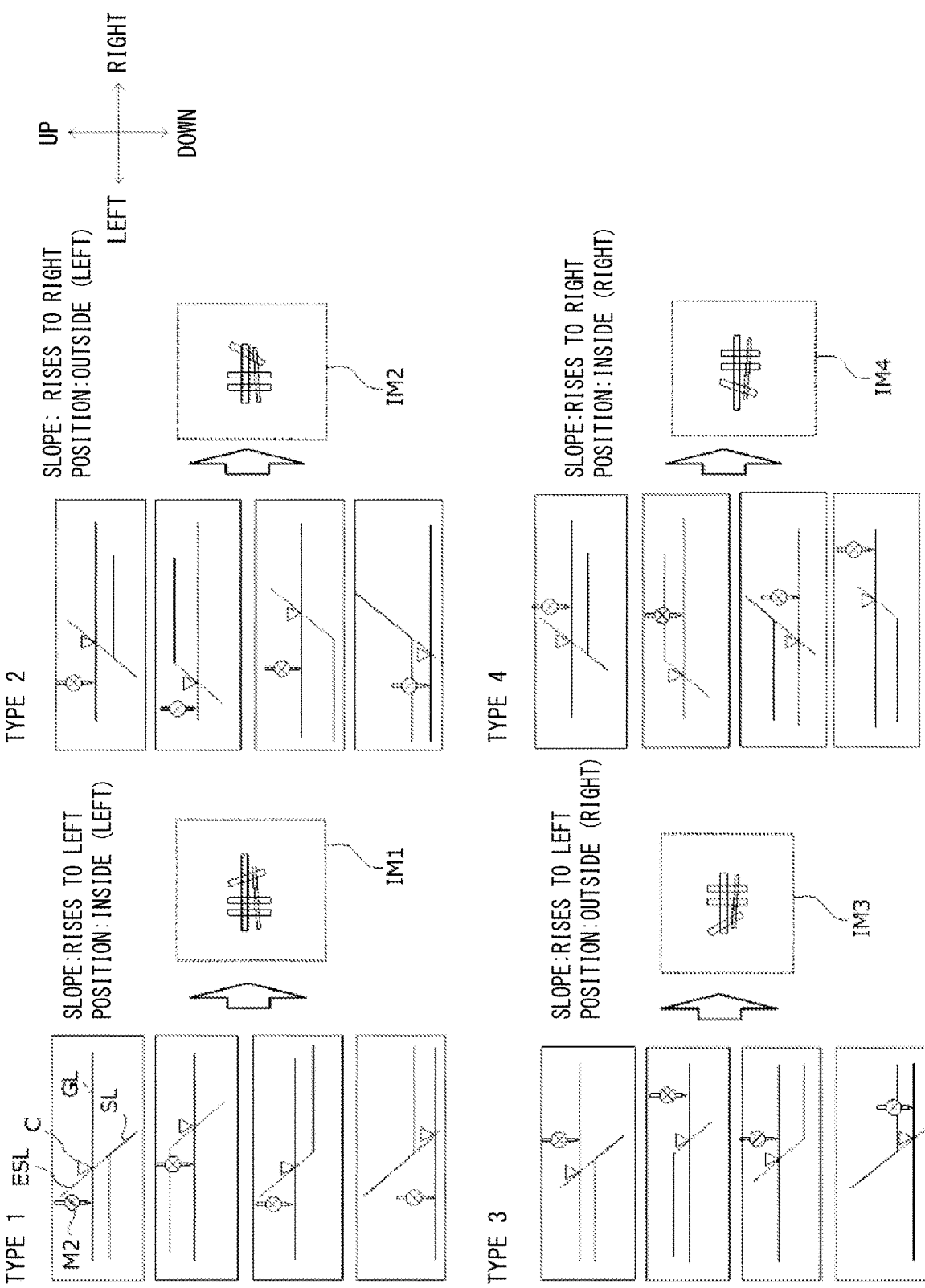
FIG. 3 shows a process of determining the shape of a stake.

FIG. 3 shows a process of determining the shape of a stake. This figure shows conditions under which the shape of the stake is determined. The slope stake to be placed is determined to be in any of four shapes of Types 1 to 4 in accordance with the direction of the slope and the surveying position. Note that the term "Type" is used for the sake of simple description of the present disclosure and is not known as an official term for the slope stake.

The shape of a stake will be described mainly using, as a representative, the condition shown as Type 1 on the upper left of this figure. The states in four views on the upper left shown as a condition of placing a slope stake according Type 1 will be described. This figure schematically shows a transverse section including a slope. Like FIG. 1, with the figure oriented to make the letters readable, the vertical direction on the drawing plane corresponds to the height, whereas the horizontal direction on the drawing plane corresponds to the horizontal direction in the transverse section including the slope. Each of these views shows a designed slope SL in civil engineering and construction work to be performed, and a current ground GL according to the surveying information on the surveying using the device 300 to be tracked. An extension ESL is the line extending from the designed slope SL. C is the intersection between the designed slope SL or the extension ESL and the current ground GL. In addition, the position of the device 300 to be tracked indicating the current ground GL, that is, the current surveying position is represented by a mark M2. Based on such information, the shape of the stake is determined in accordance with whether the designed slope rises to the left in the horizontal direction (i.e., transverse direction) and on which side of the intersection C in the horizontal direction (i.e., transverse direction) the current surveying position (i.e., the mark M2) is located. In the case of Type 1, since the slope rises to the left and the surveying position is located inside the designed slope (on the left of the intersection), a slope stake in the shape shown in an image IM1 is determined to be suggested. For example, the stake in this shape is basically placed closer to the top than to the toe of the slope so that the slope beam rises to the left (i.e., drops to the right) like the designed slope.

Similarly, in the case of Type 2, since the slope rises to the right and the surveying position is located outside the designed slope (on the left of the intersection), a slope stake in the shape shown in an image IM2 is determined to be suggested. For example, the stake in this shape is basically placed closer to the soil cutting side, that is, the outside of the slope so that the slope beam rises to the right (i.e., drops to the left) like the designed slope.

Similarly, in the case of Type 3, since the slope rises to the left and the surveying position is located outside the designed slope (on the right of the intersection), a slope stake in the shape shown in an image IM3 is determined to be suggested. For example, the stake in this shape is basically placed closer to the soil cutting side, that is, the outside of the slope so that the slope beam rises to the left (i.e., drops to the right) like the designed slope.

Similarly, in the case of Type 4, since the slope rises to the right and the surveying position is located inside the designed slope (on the right of the intersection), a slope stake in the shape shown in an image IM4 is determined to be suggested. For example, the stake in this shape is basically placed closer to the top than to the toe of the slope so that the slope beam rises to the right (i.e., drops to the left) like the designed slope.

In this way, the shape of the slope stake to be placed as the staking tool 3 is determined in accordance with the designed slope SL included in the design information and the surveying information indicating the current surveying position. Now, a specific flow of the processing will be described.

<Flow of Processing>

Figure 4:
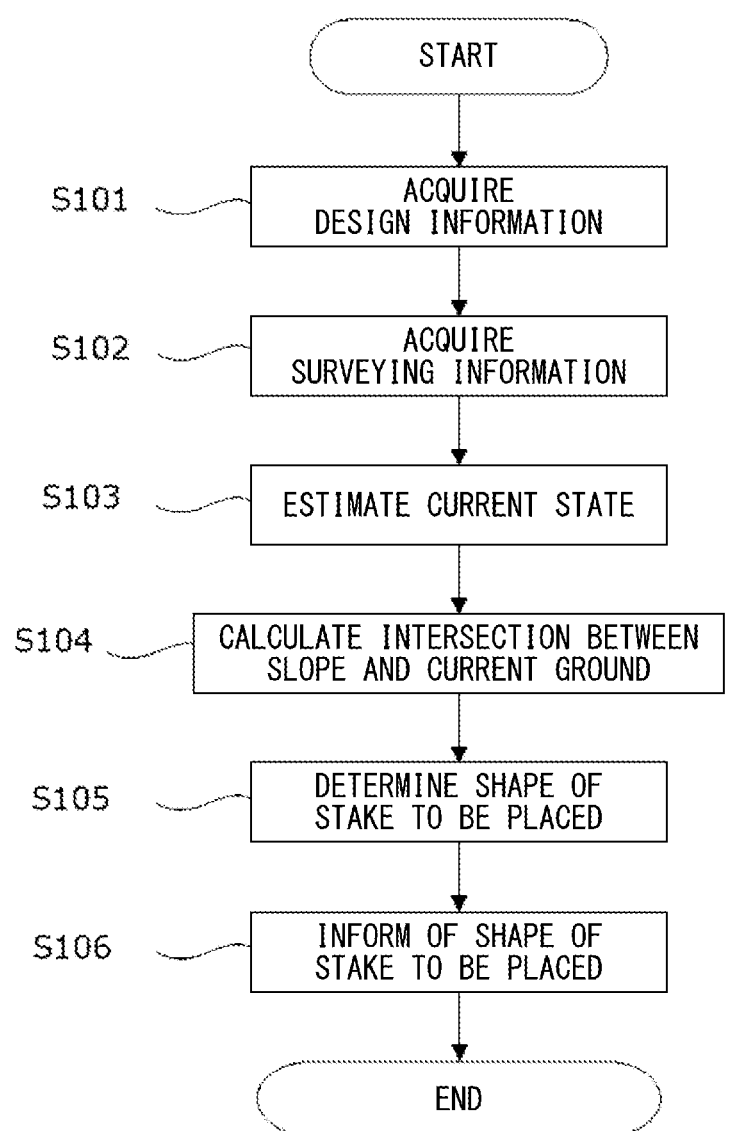
FIG. 4 is a flowchart illustrating a flow of the processing according to a staking assistance method and a staking assistance program using the surveying system of this embodiment.

FIG. 4 is a flowchart illustrating a flow of the processing according to a staking assistance method and a staking assistance program using the surveying system of this embodiment.

First, in step S101, the design information acquisition unit 121 acquires design information including a designed slope. For example, the design information acquisition unit 121 reads a file of a predetermined transverse sectional view at a predetermined site stored in the terminal device 100.

In step S102, the surveying device 200 transmits the surveying information on the surveying acquired by the surveying device 200 to the terminal device 100. The surveying information acquisition unit 122 acquires the surveying information. For example, the surveying information acquisition unit 122 performs the surveying using the surveying device 200, and acquires the information on the position of the device 300 to be tracked.

In step S103, the current state estimation unit 123 calculates the estimated altitude of the current ground in accordance with the surveying information received by the terminal device 100. For example, the current state estimation unit 123 estimates, as the current ground GL, the position of the device 300 to be tracked.

In step S104, the intersection calculation unit 124 calculates the coordinate of the intersection between the current ground GL and the designed slope SL or the extension ESL based on the estimated altitude of the current ground and the design information including the designed slope. For example, the intersection calculation unit 124 calculates the position and coordinate of the intersection C based the designed slope SL or the extension ESL acquired in step S101 and the current ground GL estimated in step S103.

In step S105, the stake shape determination unit 125 determines the shape of the slope stake to be placed, as described above, based on the surveying information and the coordinate of the intersection C. For example, the stake shape determination unit 125 determines the shape of the slope stake to be placed by the method described above based on the information on the current surveying position acquired in step S102 and the position and coordinate of the intersection C calculated in step S104.

In step S106, the stake shape information unit 126 causes the terminal device to inform of the determined shape of the stake. For example, the stake shape information unit 126 causes the screen unit 150 of the terminal device 100 to display an image corresponding to the shape of the slope stake determined in step S105.

Figure 5:
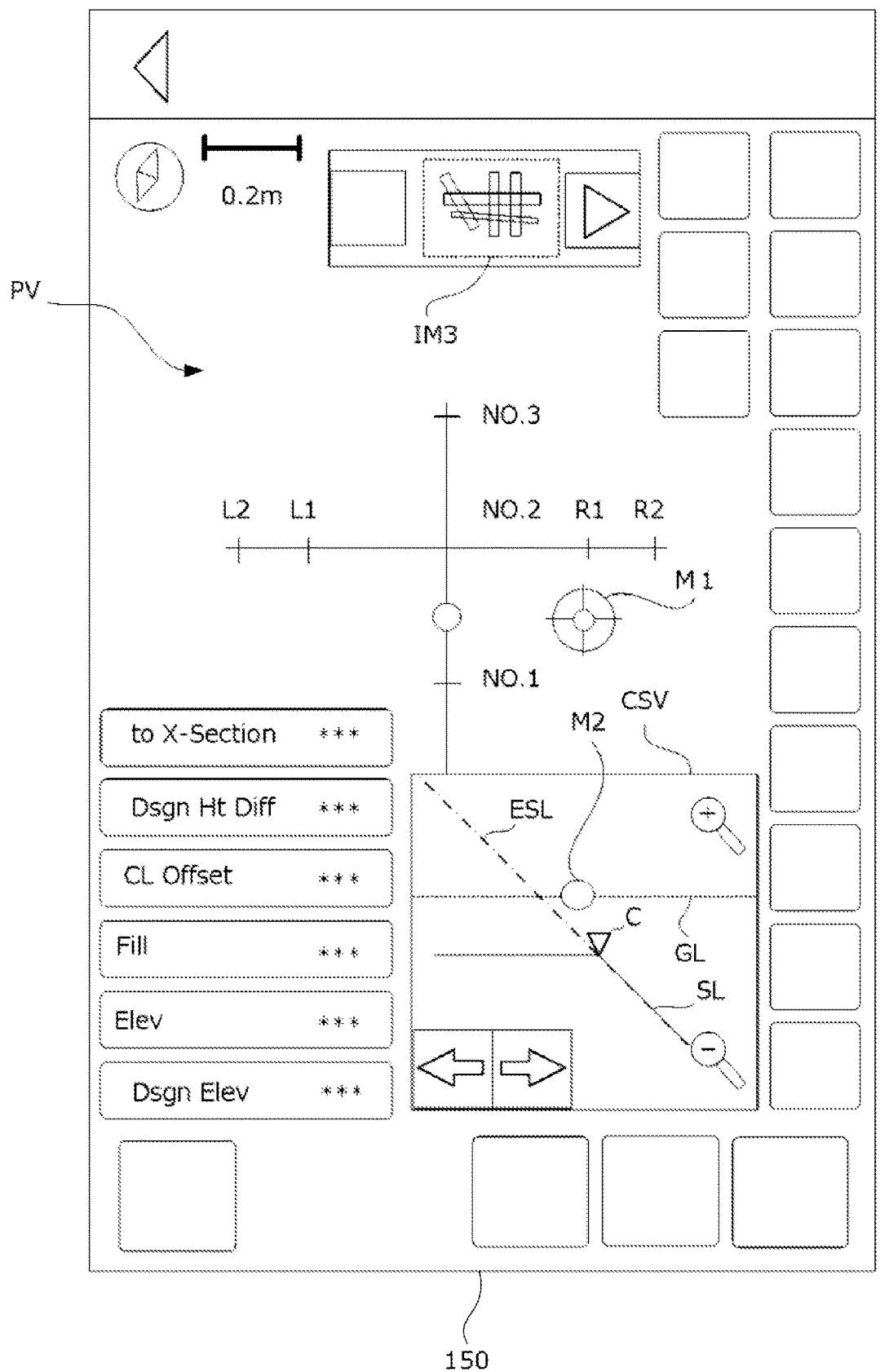
FIG. 5 is an example image displayed on an image unit of a terminal device.

FIG. 5 is an example image to be displayed on the screen unit 150 of the terminal device 100. As shown in this figure, the acquired design information may be displayed on the screen unit 150 of the terminal device 100. In response to an instruction made by the operator 2 using the input unit 140, the data on selected blueprints such as two views of a plan view and a transverse sectional view may be acquired and displayed on the screen.

In this figure, the screen displays, at the center, a plan view PV based on plan view data, and, in a small window in a lower position, a transverse sectional view CSV based on transverse view data. Like what is called a "map", the plan view PV is displayed together with the directions such as north, south, east, and west, and the scale, and shows the data on a designed route or points. The screen also displays function icons for assisting respective surveying operations. In the plan view PV and the transverse sectional view CSV, the position on the designed screen is calculated based on the position information on the device 300 to be tracked, and is displayed as the mark M1 and the mark M2 so as to be superimposed on the respective views of the screen unit 150.

The current ground GL is drawn on the transverse sectional view CSV. The designed slope SL, and the extension ESL based on the inclination are also drawn. In addition, the position of the device 300 to be tracked is displayed as the mark M2.

The shape of the stake to be placed in this case is displayed as an image IM3 in an upper position of the screen. This case corresponds to the Type 3 shown in FIG. 3, namely, the slope rises to the left, and the surveying position is located outside the designed slope (on the right of the intersection). This image is thus displayed.

As described above, the surveying system, the staking assistance method, and the staking assistance program according to an embodiment of the present disclosure includes, in addition to a surveying device 200 and a terminal device 100: a design information acquisition unit 121 configured to acquire design information including a designed slope SL; a surveying information acquisition unit 122 configured to transmit, to the terminal device 100, surveying information on surveying by the surveying device 200; a current state estimation unit 123 configured to calculate an estimated altitude of a current ground GL in accordance with the surveying information received by the terminal device 100; an intersection calculation unit 124 configured to calculate a coordinate of an intersection between the current ground GL and the designed slope SL based on the estimated altitude of the current ground GL and the design information including the designed slope SL; a stake shape determination unit 125 configured to determine a shape of a stake to be placed, based on the information on the surveying and the coordinate of the intersection; slope and a stake shape information unit 126 configured to cause the terminal device 100 to inform of the shape of the stake determined by the stake shape determination unit 125. Based on the surveying information and design information that the operator 2 has, an assistance is possible for easily determining what kind of a slope staking tool is to be placed, including the position or orientation of a slope beam to be placed, at a site at which the slope staking tool may be located in various positions in various positional relationships with a slope.

The stake shape information unit 126 causes the terminal device 100 to display an image corresponding to the shape of the stake so that the operator 2 intuitively grasps the shape of the stake to be placed.

The stake shape information unit 126 causes an audio output unit of the terminal device to output the shape of the stake so that the operator 2 grasps the shape of the stake to be placed while performing other operations without viewing the screen unit 150, for example.

The stake shape information unit 126 informs of the order of arranging the pickets, crossbeams, and slope beam constituting the staking tool 3 corresponding to the stake shape via the terminal device 100 so that a person unskilled in the operation arranges the members constituting the staking tool 3 in a proper order.

Thus, the embodiment of the present disclosure has been described hereinabove. However, the present disclosure is not limited to the embodiment described above.

DESCRIPTION OF REFERENCE CHARACTERS

1 Surveying System
2 Operator
3 Staking Tool
100 Terminal Device
110 Terminal Processing Unit
120 Terminal Storage Unit
121 Design Information Acquisition Unit
122 Surveying Information Acquisition Unit
123 Current State Estimation Unit
124 Intersection Calculation Unit
130 Terminal Communication Unit
140 Input Unit
150 Screen Unit
200 Surveying Device
210 Surveying Unit
211 Distance Measurement Unit
212 Angle Measurement Unit
220 Surveying Storage Unit
230 Surveying Communication Unit
240 Surveying Control Unit
250 Tracking Control Unit
300 Device to Be Tracked GL Current Ground
SL Designed Slope
C Intersection

What is claimed is:

1. A surveying system for assisting placement of a staking tool including a picket, a crossbeam, and a slope beam, the surveying system comprising, in addition to a surveying device and a terminal device:
   a design information acquisition unit configured to acquire design information including a designed slope;
   a surveying information acquisition unit configured to transmit, to the terminal device, surveying information on surveying by the surveying device;
   a current state estimation unit configured to calculate an estimated altitude of a current ground in accordance with the surveying information received by the terminal device;
   an intersection calculation unit configured to calculate a coordinate of an intersection between the current ground and the designed slope based on the estimated altitude of the current ground and the design information including the designed slope;
   a stake shape determination unit configured to determine a shape of a stake to be placed, based on a direction of the designed slope of the surveying information and on which side of the intersection in a horizontal direction a current surveying position is located; and
   a stake shape information unit configured to cause the terminal device to inform of the shape of the stake determined by the stake shape determination unit.

2. The surveying system of claim 1, wherein the stake shape information unit causes the terminal device to display an image corresponding to the shape of the stake.

3. The surveying system of claim 1, wherein the stake shape information unit causes an audio output unit of the terminal device to output the shape of the stake.

4. The surveying system of claim 1, wherein the stake shape information unit causes the terminal device to inform of an order of arranging the picket, the crossbeam, and the slope beam constituting the staking tool corresponding to the shape of the stake.

5. A staking assistance method of assisting placement of a staking tool including a picket, a crossbeam, and a slope beam using a surveying system including a surveying device and a terminal device, the method comprising:
   acquiring design information including a designed slope, using a design information acquisition unit;
   surveying using the surveying device;
   transmitting, to the terminal device, surveying information on the surveying, using a surveying information acquisition unit;
   calculating an estimated altitude of a current ground in accordance with the surveying information received in the surveying information acquisition, using a current state estimation unit;
   calculating a coordinate of an intersection between the current ground and the designed slope based on the estimated altitude of the current ground and the design information including the designed slope, using an intersection calculation unit;
   determining a shape of a stake to be placed, based on a direction of the designed slope of the surveying information and on which side of the intersection in a horizontal direction a current surveying position is located, using a stake shape determination unit; and
   stake shape information of causing the terminal device to inform of the shape of the stake determined in the stake shape determination, using a stake shape information unit.

6. A non-transitory storage medium storing a staking assistance program for assisting placement of a staking tool including a picket, a crossbeam, and a slope beam using a surveying system including a surveying device and a terminal device, the program configured to cause a computer to execute steps comprising:
   acquiring design information including a designed slope, using a design information acquisition unit;
   surveying using the surveying device;
   transmitting, to the terminal device, surveying information on the surveying, using a surveying information acquisition unit;
   calculating an estimated altitude of a current ground in accordance with the surveying information received in the surveying information acquisition, using a current state estimation unit;
   calculating a coordinate of an intersection between the current ground and the designed slope based on the estimated altitude of the current ground and the design information including the designed slope, using an intersection calculation unit;
   determining a shape of a stake to be placed, based on a direction of the designed slope of the surveying information and on which side of the intersection in a horizontal direction a current surveying position is located, using a stake shape determination unit; and
   causing the terminal device to inform of the shape of the stake determined in the stake shape determination, using a stake shape information unit.

* * * * *